US 6,739,601 B1

(12) United States Patent
Fine

(10) Patent No.: US 6,739,601 B1
(45) Date of Patent: May 25, 2004

(54) TRAILER TONGUE JACK HAVING MANUALLY POWERED GUIDANCE

(76) Inventor: Boyce Fine, 28 N. Redwood Dr., Sallisaw, OK (US) 74955

( * ) Notice: Subject to any disclaimer, the term of this patent is extended or adjusted under 35 U.S.C. 154(b) by 0 days.

(21) Appl. No.: 10/441,541

(22) Filed: May 20, 2003

Related U.S. Application Data

(63) Continuation-in-part of application No. 10/038,955, filed on Jan. 2, 2002, now Pat. No. 6,619,671.

(51) Int. Cl.$^7$ .................................................. B60S 13/00
(52) U.S. Cl. ............................ 280/3; 280/261; 280/475; 280/767
(58) Field of Search ................................ 280/260, 261, 280/259, 475, 477, 767, 476.1

(56) References Cited

U.S. PATENT DOCUMENTS

| 3,183,013 A | * | 5/1965 | Brown ........................... 280/3 |
| 3,269,740 A | * | 8/1966 | Hutchinson .................... 280/3 |
| 3,934,852 A | * | 1/1976 | Weber et al. ................. 254/420 |
| 4,168,074 A | * | 9/1979 | Morris ........................... 280/3 |
| 5,016,900 A | | 5/1991 | McCully ..................... 280/477 |
| 6,439,545 B1 | | 8/2002 | Hansen ......................... 254/420 |

FOREIGN PATENT DOCUMENTS

| EP | 0112735 | 11/1983 |
| GB | 2046190 | 11/1980 |

* cited by examiner

Primary Examiner—Kevin Hurley
(74) Attorney, Agent, or Firm—Gable & Gotwals; Paul H. Johnson

(57) ABSTRACT

An improved jack for supporting and moving a horizontally extending trailer tongue above the earth's surface having a longitudinally extending support shaft, a bracket rotatably attaching the support shaft to a trailer tongue by which the support shaft may be pivoted between a horizontal position and a vertical position, a wheel housing affixed to the support, a ground engaging wheel rotatably supported adjacent the wheel housing and having a wheel gear affixed thereto; a crank arm rotatably supported by the wheel housing adjacent an upper end thereof at a height closer to the trailer tongue than the earth's surface, and a rotation transfer system coupling the crank arm to the wheel for moving the trailer tongue, the elevation of the crank arm requiring reduced bending over by an operator standing on the earth's surface.

2 Claims, 8 Drawing Sheets

TRAILER TONGUE JACK HAVING MANUALLY POWERED GUIDANCE

REFERENCE TO PENDING APPLICATIONS

This is a Continuation-In-Part of U.S. application Ser. No. 10/038,955 filed Jan. 2, 2002 now U.S. Pat. No. 6,619,671 and entitled POWER WHEEL FOR A TRAILER TONGUE JACK.

FIELD OF THE INVENTION

This invention relates to an improved jack for a horizontally extending trailer tongue.

BACKGROUND OF THE INVENTION

The front end of a trailer is generally supported by a trailer tongue jack when the trailer is parked, that is, not connected to a towing vehicle. The typical trailer tongue jack is secured to a horizontally extending trailer tongue and has a base plate at the lower end of the jack. The jack is usually in the form of an elongated shaft. The shaft typically has an upper portion that is secured to the trailer tongue and a lower portion that is telescopic with respect to the shaft. An upper crank arm that can be rotated about a vertical axis or, in some cases, about a horizontal axis, is utilized to telescopically extend or retract the lower portion of the elongated shaft. As the lower portion of the shaft is telescopically extended or withdrawn with respect to the upper portion, the elevation of the trailer tongue can be varied.

When a vehicle is backed up to engage a trailer hitch that is secured to the forward end of a trailer tongue, precise maneuvering is required. A vehicle may be required to back up several times for alignment with the trailer hitch secured to the trailer tongue.

For these reasons a need exists to provide an improved system by which a trailer tongue may be moved so that a trailer hitch on the trailer tongue may be positioned to engage a ball hitch on the rear end of a vehicle.

Others have addressed this problem as revealed in the following previously issued patents:

| Patent Number | Inventor(s) | Title |
| --- | --- | --- |
| European 0112735 | Pinolt | Apparell auxillaire d'entrainement manuel pour remorque, notamment pour caravane |
| Great Britain 2,046,190 | Belton et al. | Improvements In and Relating to Attachments for Trailer Units |
| 1,373,352 | Rice | Caster |
| 3,183,013 | Brown | Trailer Spotter |
| 3,269,740 | Hutchinson | Vehicle Moving Mechanism |
| 3,439,764 | Kimball | Power Caster for Moving Trailers |
| 3,482,847 | Hart | Trailer Guide Wheel Construction |
| 3,738,672 | Dalton | Dolly for Moving Vehicles |
| 4,168,074 | Morris | Apparatus for Moving Caravans and Other Trailed Vehicles |
| 4,210,217 | Lachowicz | Self-Propelled Steering |
| 4,227,706 | Morris | Traction Devices for Towed Vehicles |
| 4,416,460 | Morris | Drive Mechanisms |
| 4,463,961 | Fernandez | Manually Moving a Trailer |
| 4,470,564 | Johnson | TUG |
| 4,860,841 | Sacco | Device for Maneuvering of Trailers |
| 5,016,900 | McCully | Device for Accomplishing Directional Movement of a Trailer |
| 5,338,047 | Knisley | Trailer Alignment Device |
| 6,439,545 | Hansen | Motorized Jack for Trailers |

A problem exists with trailer tongue jacks as illustrated and described in the above-referenced U.S. Patents. Specifically, there does not exist, to the knowledge of the applicant, a trailer tongue jack that is pivotally affixed to a trailer tongue so that it can be pivoted in a first position in which it is horizontal and substantially parallel to a trailer tongue and pivoted to a second position in which it is vertical, that is substantially perpendicular to a trailer tongue, with a wheel at the lower end thereof and a simple lightweight and effective mechanism by which power can be applied manually to move the wheel and the wheel guided so that the trailer tongue can be easily moved to alignment with a ball hitch on a vehicle.

Accordingly, an object of this invention is to provide an improved jack for a trailer tongue having a system of drive gears to achieve a mechanical advantage by which a trailer tongue can be more easily positioned using manual power.

BRIEF SUMMARY OF THE INVENTION

This invention provides an improved jack for a horizontally extending trailer tongue of the type having, at the forward end of the trailer tongue, a trailer hitch that is typically of the type that is attachable and detachable from a ball post affixed to a vehicle.

The improved jack includes a bracket that is attached to a trailer tongue. A longitudinal shaft is supported to the bracket and pivotal between a first position in which the shaft is substantially horizontal and parallel to the trailer tongue and a second position to which the shaft is vertical, that is, at least substantially perpendicular to the trailer tongue. It is in the second position that the trailer tongue jack is used when the trailer is at rest, and also when the trailer tongue jack is used to align the trailer for connection of the trailer hitch to a ball post mounted at the rearward end of a vehicle.

The longitudinal shaft is typically formed of an upper portion and a telescopic lower portion. By means of a first crank arm at the upper end of the longitudinal shaft, the lower portion may be extended or withdrawn telescopically with respect to the upper portion, to thereby, when the shaft is in the vertical position, raise or lower the elevation of the trailer tongue. The lower portion of the elongated shaft is rotatable with respect to the shaft upper portion or, as an alternative arrangement, the shaft upper portion may be rotatably supported to the bracket so that by either means the lower portion of the shaft may be rotated about the shaft longitudinal axis.

Affixed to the lower end of the shaft is a wheel housing. Received by the wheel housing is a wheel that is rotated with respect to the housing about a horizontal axis. A crank arm is rotatably affixed to the wheel housing and has a drive gear that is rotated by the crank arm. A driven gear is affixed to the wheel. An intermediate gear is also supported by the wheel housing. The drive gear is interconnected with the intermediate gear that is, in turn, connected to the driven gear so that when the drive gear is rotated as the crank arm is rotated, the intermediate gear and the driven gear and thereby the wheel is rotated. In one embodiment, a first flexible chain, which typically may be such as a bicycle chain, interlinks the drive gear and the intermediate gear and a second flexible chain interlinks the intermediate gear and the driven gear. Instead of the chain, belts could be employed. In another embodiment, the drive gear is directly coupled to an intermediate gear that is then rotationally coupled to the driven gear. This can be accomplished by teeth on the drive gear directly meshing with teeth on the intermediate gear which is coupled to rotate the driven gear. The intermediate gear is employed so that a direct gear drive with improved mechanical advantage extends between the drive gear and the driven gear. Irrespective of the particular system used for coupling the rotation of the crank arm to turning the wheel, it is important that a mechanical advantage be obtained so that a relatively small force is required to rotate the crank arm to move the wheel and thereby move the trailer tongue when aligning a trailer hitch to a ball post.

In the process of aligning a trailer hitch with a ball post it is nearly always necessary to change the direction of movement of the trailer tongue. Direction change is accomplished by rotating the lower portion of the elongated shaft about its longitudinal axis to thereby change the direction of travel of the wheel. The lower portion of the elongated shaft can be rotated by use of the crank arm or, in another embodiment, a guide handle may be extended from the lower portion of the shaft or, more specifically, from the wheel housing. The handle may have a hinged portion so that it can be pivoted out of the way except when being used to guide the direction of travel of the wheel.

For convenience of use, it is important that the drive gear be rotated about an axis that is elevated well above the axis of the wheel so that an operator does not have to bend over excessively to rotate the crank arm to achieve rotation of the drive gear. In the invention herein, the axis of rotation of the crank arm is positioned well above the lower end of the longitudinal shaft having the wheel housing affixed to it.

A more complete understanding of the invention will be obtained by reference to the following specification of the preferred embodiment, taken in conjunction with the attached drawings.

DESCRIPTION OF THE DRAWINGS

FIG. 1 shows the trailer tongue being maneuvered so that a trailer hitch at the forward end of the trailer tongue may be connected with the ball host secured to a vehicle.

FIG. 8 shows one means of coupling rotational power from a crank arm to the trailer jack.

DETAILED DESCRIPTION OF A PREFERRED EMBODIMENT

The invention, and improvements, will be described by reference to drawing FIGS. 1 through 14 in which elements of the structures shown are identified by numbers as follows:

| | |
|---|---|
| 10 | Jack Fixed Portion |
| 12 | Telescoping Portion |
| 14 | Bracket |
| 16 | Trailer Hitch Ball Post |
| 18 | Nut |
| 20 | Ball |
| 22 | Trailer Tongue |
| 24 | Trailer Hitch |
| 26 | Concave Housing |
| 28 | Improved Trailer Hitch Jack |
| 30 | Bracket |
| 32 | Bracket Fixed Portion |
| 34 | Bracket Rotatable Portion |
| 36 | Retractable Pin |
| 38 | Longitudinal Shaft Upper Portion |
| 40 | Longitudinal Shaft Lower Portion |
| 42 | Wheel Housing |
| 42A | First Side Wall |
| 42B | Second Side Wall |
| 42C | Housing Bite Portion |
| 44 | Horizontal Axle |
| 44A | Axle Bolt Head |
| 44B | Axle Bolt Nut |
| 46 | Wheel |
| 48 | Earth's Surface |
| 52 | First Crank Arm |
| 54 | Handle |
| 56 | Driven Gear |
| 56A | Driven Gear |
| 58 | Second Crank Arm |
| 58A | Second Crank Arm Shaft |
| 60 | Handle |
| 62 | First Drive Gear |
| 64 | Chain |
| 66 | Teeth |
| 68 | Arrows |
| 70 | Intermediate Gear |
| 72 | Shaft |
| 74 | Second Intermediate Gear |
| 76 | Steering Lever |
| 78 | Steering Lever Outer Portion |
| 80 | Handle |
| 82 | Improved Wheel Housing |
| 84 | Lower End |
| 86 | Upper End |
| 88 | Lower End of 40 |
| 90 | Horizontal Plate |

-continued

| | |
|---|---|
| 92 | First Side Wall |
| 94 | Second Side Wall |
| 96 | Shaft |
| 98 | Power Gear |
| 100 | Driven Gear |
| 102 | Drive Chain |
| 104 | Chain |
| 106 | Latch |
| 108 | Motor |
| 110 | Gear Drive |
| 112 | Beveled Drive Gear |
| 114 | Drive Shaft |
| 116 | A & B Bushings |
| 118 | Beveled Driven Gear |
| 120 | Worm Gear |

Figure 1:
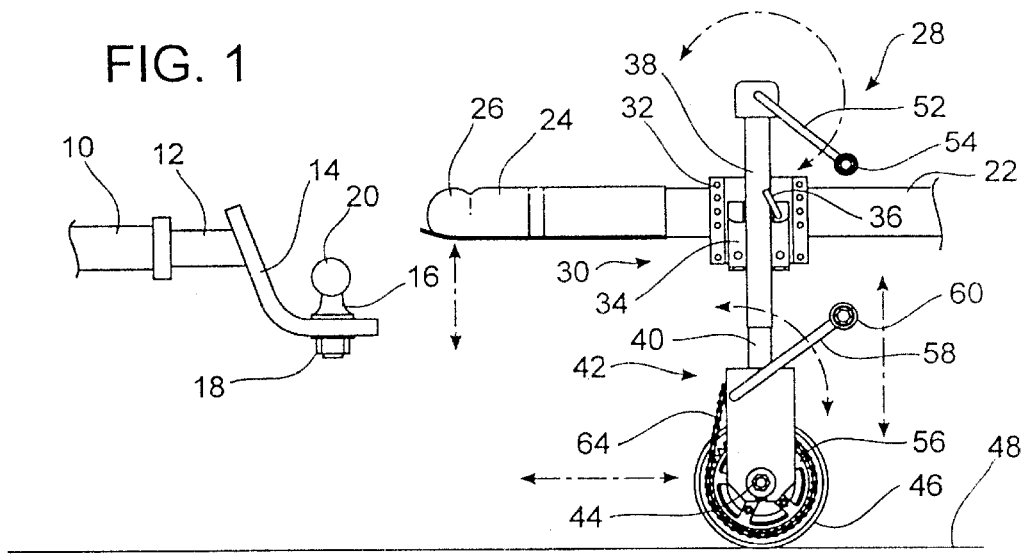
FIG. 1 is an elevational view showing, on the left hand side, a trailer hitch system extending from a vehicle, the trailer hitch system having a post with a trailer hitch ball at its upper end. On the right hand side of the view of FIG. 1 is a portion of a trailer tongue with the improved jack of this invention mounted on it.

Portions of a typical trailer vehicle hitch are shown in the left hand part of FIG. 1. Trailers of the type commonly pulled by vehicles include trailer homes, boat trailers, horse trailers, trash hauling trailers, lawn mowing equipment trailers and so forth. A vehicle trailer hitch typically includes a fixed portion 10 that is permanently secured to the rear end of a vehicle with a removable telescoping portion 12 having a bracket 14 at the outer end thereof. Secured to a horizontal portion of bracket 14 is a trailer hitch ball post 16 field by a large nut 18. The upper end of trailer hitch ball post 16 is a spherical ball 20.

Telescoping portion 12 with the other parts of the trailer hitch that are attached to it can be removed from the fixed portion 10 when the trailer hitch is not in use.

The vehicle trailer hitch illustrated by elements 10–20 are not a part of the invention herein but are illustrated to show the environment in which the invention is utilized. A typical trailer has a horizontally extending trailer tongue with a trailer hitch at the forward end that includes a cavity for capturing ball 20. A difficult problem arises when attempting to connect a trailer to a vehicle having a trailer hitch of the elements 10–20 since the trailer hitch must be elevationally aligned above ball 20 before it can be coupled to the ball. The invention herein provides an improved way of interconnecting a trailer with the trailer hitch system of elements 10–20.

In the right hand portion of FIG. 1 is shown a trailer tongue 22 that extends generally horizontally from trailer, the trailer itself not being shown. At the forward end of trailer tongue 22 is a typical trailer hitch 24 that has, at the forward end thereof, a portion that provides a concave socket, only the exterior or a concave housing 26 being shown. To connect trailer tongue 22 to a trailer hitch having elements 10–20, the concave housing 26 must be fitted over spherical ball 20.

To assist in accomplishing this purpose, the improved trailer hitch jack of this invention is generally indicated by the numeral 28.

A bracket 30 is used to mount the trailer hitch jack to trailer tongue 20. Bracket 30 typically consists of a fixed portion 32 that is bolted or clamped to trailer tongue 22, and a rotatable portion 34 that pivots in a horizontal plane with respect to fixed portion 32. A retractable pin 36 is used to lock the rotatable portion 34 in one of two positions with respect to fixed bracket portion 32.

Secured to rotatable bracket 34 is a longitudinal shaft upper portion 38. Telescopically extending from a lower end of the shaft upper portion 38 is a shaft lower portion 40. Affixed at a lower end of a shaft lower portion 40 is a wheel housing 42. Mounted about a horizontal axle 44 to wheel housing 42 is a wheel 46 that rests on the earth's surface 48. Thus, wheel 46 secured to the lower end of the longitudinal shaft supports trailer tongue 22 above the earth's surface.

The shaft lower portion 40 is telescopically extendable and retractable with respect to the shaft upper portion 38. The extension or retraction is controlled by a first crank arm 52 having a handle 54. As crank arm 52 is rotated, shaft lower portion 40 is retracted or extended according to the direction of rotation. This extension or retraction is obtained by a gearing arrangement between crank arm 52 and an externally threaded member within upper shaft portion 38, the details which are not illustrated since this arrangement is commonly known to the industry. As illustrated in FIGS. 1–7, first crank arm 52 rotates in a vertical plane about a horizontal axis, however, many trailer jacks have a system wherein the first crank arm rotates in a horizontal plane about a vertical axis to extend or retract shaft lower portion 40 to raise or lower trailer tongue 22.

Figure 8:
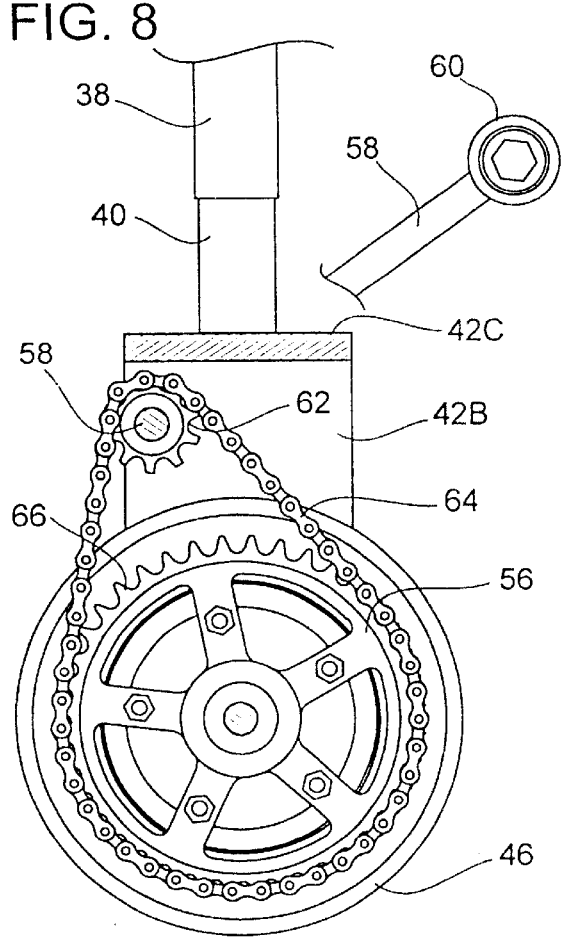
FIG. 8 is a fragmentary view of the lower portion of the improved trailer tongue jack showing one embodiment in which a chain, such as a bicycle chain, is used to couple a drive wheel that is rotated by a crank arm to a driven wheel secured to the trailer jack wheel.

An important part of this invention is the provision for rotating wheel 46 so that trailer tongue 22 may be moved over the earth's surface to facilitate connecting trailer hitch 24 to ball post 16. Affixed to wheel 46 is a driven gear 56 as seen best in FIGS. 1, 4, 5, 7, 8 and 9. Rotatably supported to wheel housing 42 is a second crank arm 58 having a handle 60 by which the crank arm is rotated. As best seen in FIGS. 5, 7, 8 and 9, there is affixed to the inner end of crank arm 58 a drive gear 62. Looping around drive gear 62 and driven gear 56 is a chain 64 that may, as example, be in the form of a bicycle chain. Drive gear 56 and driven gear 62 may have teeth like the sprockets of a bicycle gear to receive chain 64. Specifically, FIG. 8 shows driven gear 56 with teeth 66 configured to be engaged by a bicycle type chain 64.

Instead of a chain 64, the same arrangement could be made using a drive belt in which case drive gear 62 and driven gear 56 would be in the form of shivs or pulleys to receive a drive belt, but the function would be the same as illustrated.

As crank arm 58 rotates wheel 46, trailer tongue 22 and, correspondingly, the trailer to which it is secured can be moved over the earth's surface 48 so that trailer hitch 24 can be in position to fit down upon trailer hitch post spherical ball 20.

Figure 2:
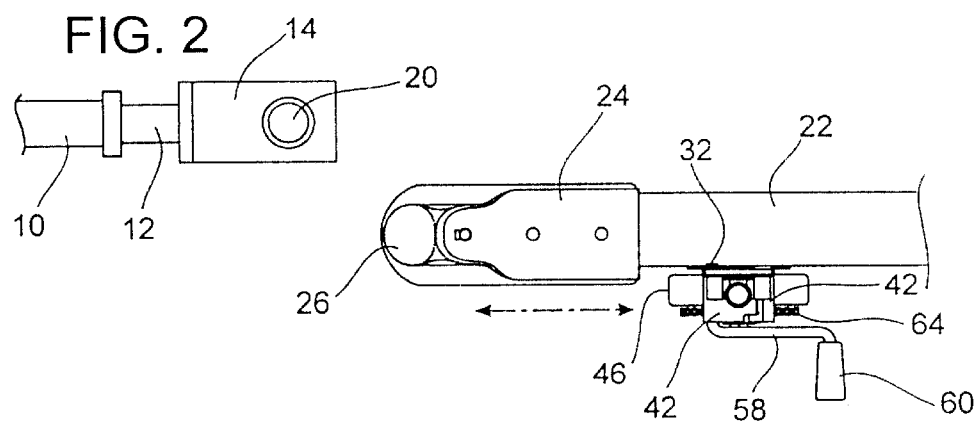
FIG. 2 is a top view of the system of FIG. 1 showing on the left hand portion of the view the trailer hitch secured to a vehicle and showing on the right hand portion the trailer tongue with the improved jack of this invention.
Figure 3:
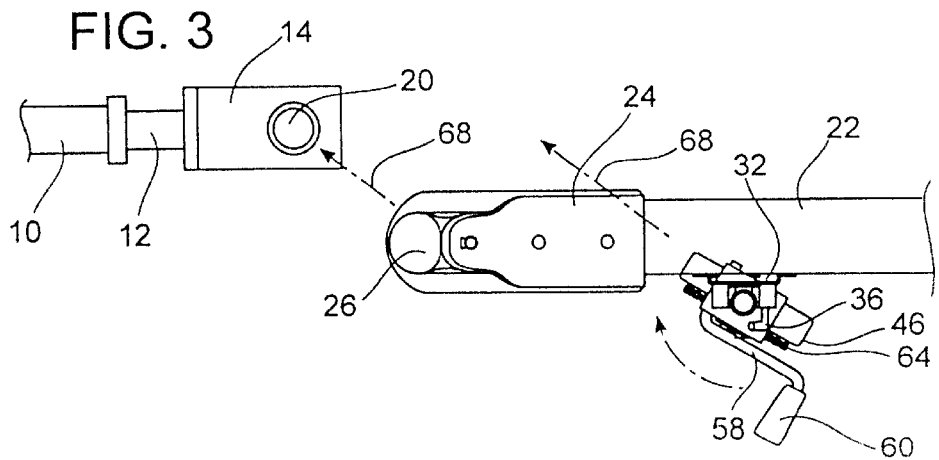
FIG. 3 is a further view of FIG. 2 showing how the improved jack of this invention is utilized to maneuver a trailer tongue so that the trailer hitch can be secured to a ball post on a vehicle.

FIG. 2 is a top plan view showing the trailer hitch structure on the left and showing the trailer tongue 22 and so forth on the right. FIG. 2 shows wheel housing 42 and wheel 46 aligned parallel to tongue 22 so that if crank arm 58 is rotated, wheel 46 would move the trailer in a direction fore or aft of tongue 22, as indicated by an arrow. To align the concave socket 26 of trailer hitch 24 with spherical ball 20, the trailer tongue must be moved not only forwardly but also laterally in a direction indicated by arrows 68 as shown in FIG. 3. By rotating the shaft lower portion 40 to the angles indicated by arrows 68 and rotating crank arm 58, wheel 46 will move trailer tongue 22 and trailer hitch 24 so that the concave socket housing 26 can be moved directly over spherical ball 20. When directly over the spherical ball, the first crank arm 52 may be rotated to telescopically withdraw lower portion 40 of the shaft to reduce the height of trailer tongue 22 so that the concave socket housing 26 settles down over spherical ball 20. Trailer hitch 24 normally has a mechanism for latching it onto spherical ball 20. Such latching mechanism is not shown since this is a commonly practiced procedure for all trailer hitches required for safety purposes and therefore the details of the trailer hitch latch are not part of this invention.

Figure 9:
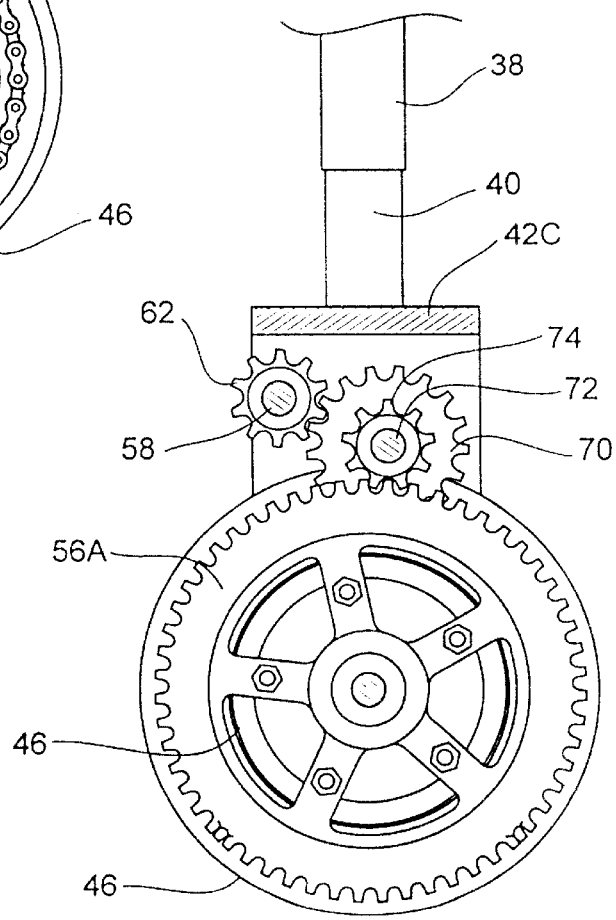
FIG. 9 is a fragmentary view as in FIG. 8 but showing an alternate arrangement for coupling power from a crank arm to rotate the trailer jack wheel in which the method of coupling uses intermediate gears.

As previously stated, drive gear 62 that is rotated by second crank arm 58 may be coupled to driven gear 62 to rotate wheel 46 either by means of a chain or a belt. A third means of coupling the rotation of second crank arm 58 to wheel 46 is by direct gear drive as illustrated in FIG. 9. In FIG. 9, a chain or belt is not employed and instead an intermediate gear 70 that rotates about shaft 72 is mounted within wheel housing 42. It can be seen that intermediate gear 70 may be dimensioned so that it directly couples between drive gear 62 and driven gear 56A, however, in the embodiment illustrated in FIG. 9, a second intermediate gear 74 is used. Gear 74 is mounted on shaft 72. Intermediate gears 70 and 74 are locked for rotation with each other. The arrangement of FIG. 9 is important for two reasons. First, it shows direct gear drive between driven gear 56A and the drive gear 62. Second, a means of increasing the mechanical ratio between rotation of second crank arm 58 and the rotation of driven gear 56A is achieved. By employing a primary intermediate gear 70 and a secondary intermediate gear 74, the gear ratio between the rotation of second crank arm 58 and the rotation of wheel 46 is substantially increased so that if the trailer jack is used on a large or heavy trailer the trailer can be moved even by a small person rotating crank arm 58.

Wheel housing 42 is in the form of an integral plate having vertically extending side walls 42A and 4213 that are parallel to each other. The plate may be made of a single piece of metal, such as steel, bent into a U-shape in which the bite portion 42C is integral with the side portion 42A and 42B. A wheel housing of such U-shaped construction, whether made of one piece or more than one piece, has advantages in that it provides an easy way to attach the lower end of shaft lower portion 40 to the housing and provides a convenient way for supporting axle 44 that may, as illustrated, be in the form a bolt having a head 44A and a nut 44B. In addition, second crank arm 58 is conveniently rotatably supported by side walls 42A and 42B.

Figure 4:
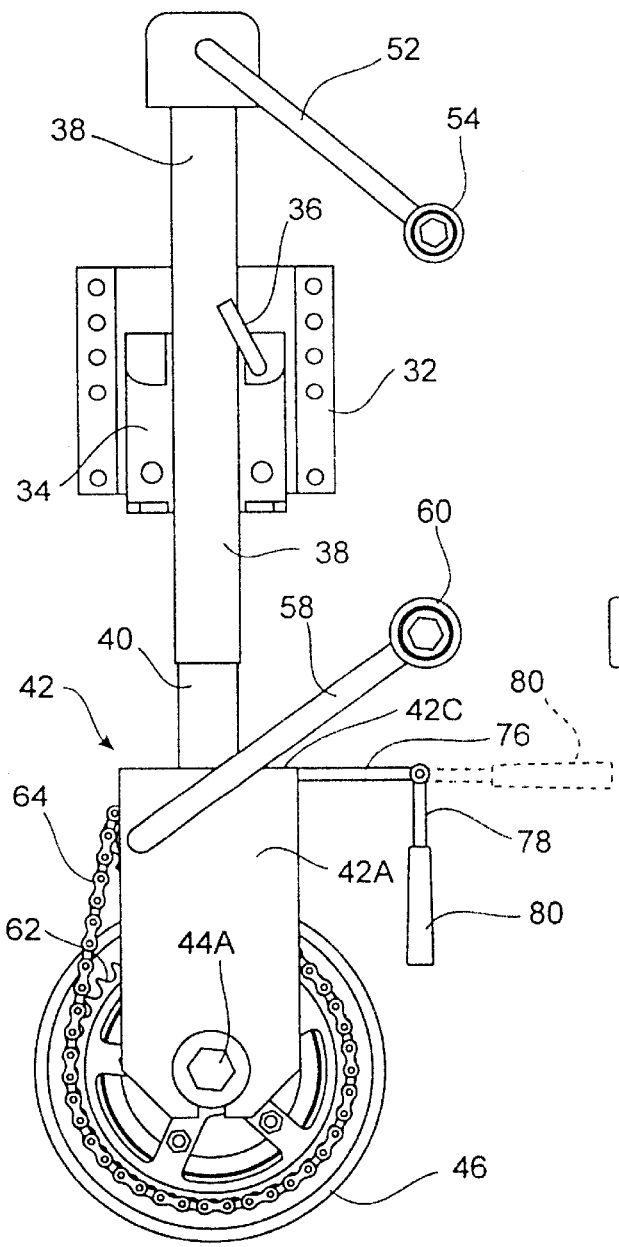
FIG. 4 is an enlarged elevational side view of the improved trailer hitch jack as shown in FIGS. 1–3.
Figure 5:
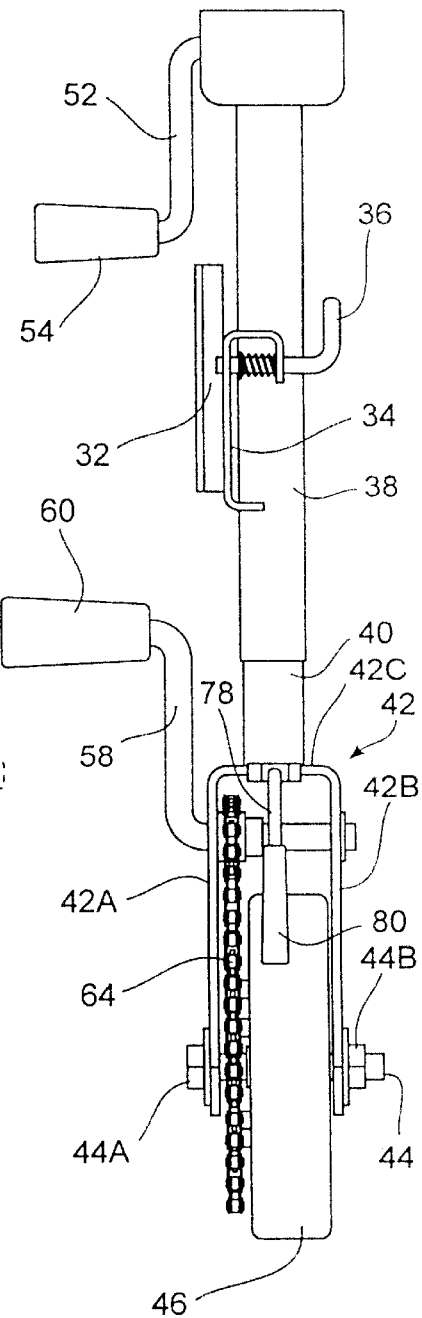
FIG. 5 is a rear view of the improved trailer tongue jack as shown in FIG. 4.
Figure 6:
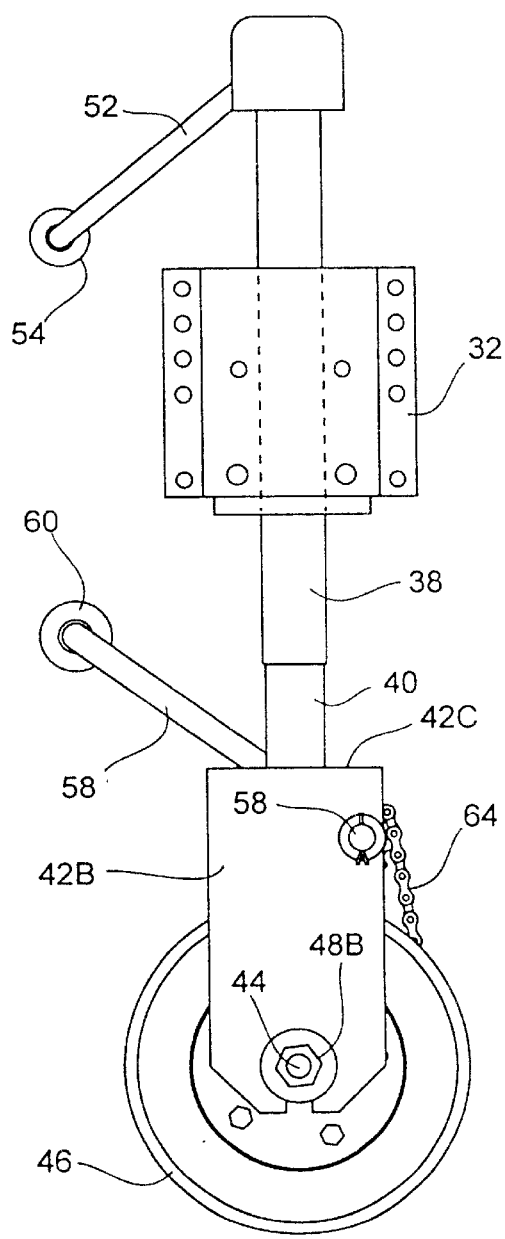
FIG. 6 is a view of the improved trailer tongue jack as seen from the side opposite of that of FIG. 4.
Figure 7:
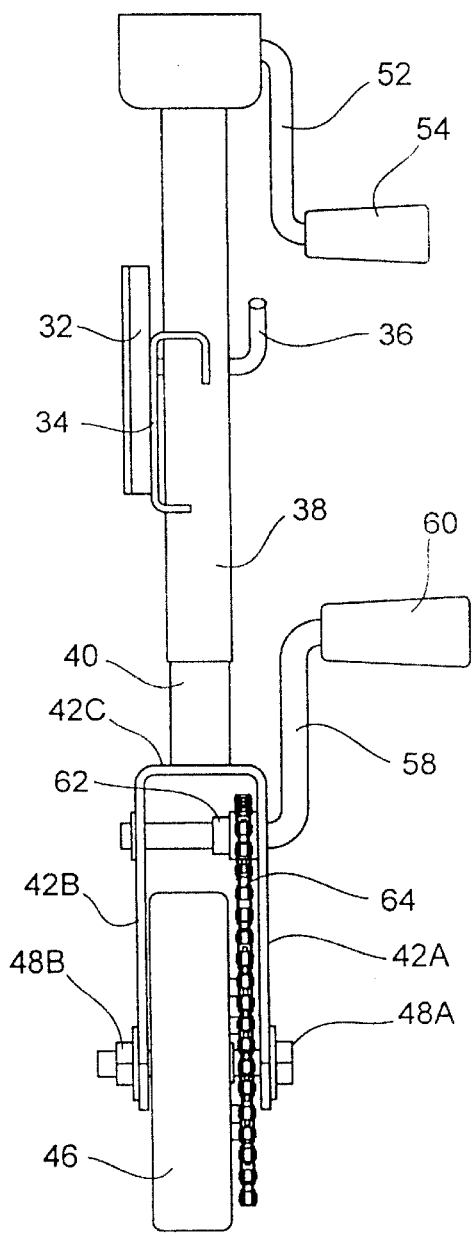
FIG. 7 is a front view of the improved jack.

Comparing FIG. 2 and FIG. 3 shows the importance of guiding the direction of travel of wheel 46, the direction of wheel travel is easily achieved by rotating wheel housing 42 which, unless the trailer is very heavy, can normally be accomplished by using leverage supplied by second crank arm 58. However, if additional leverage is required to conveniently change the direction of wheel 46, a steering lever 76 may be employed as shown in FIGS. 4 and 5. Steering lever 76 has an inner end that is attached directly to the bite portion 42C of wheel housing 42. In the preferred arrangement as illustrated, steering lever 76 has a pivoted outer portion 78 with a handle 80. When not in use, the pivoted outer portion 78 can hang down vertically as shown in FIG. 4, but when the steering lever is needed to guide wheel 46, the outer portion is pivoted to the horizontal position as shown in dotted outline in FIG. 4 to make it easy to guide the wheel when a trailer is being moved to be attached to a towing vehicle.

Rotation of wheel 46 must impose sufficient traction on the earth's surface 48 to cause the trailer to which tongue 22 is attached to move. If a trailer is parked in an area wherein there is little traction between wheel 46 and the earth's surface, such as if the trailer is parked on grass, dirt, or gravel, then it is important that provision be made so that ample friction is achieved to move the trailer. This can easily be accomplished by employing a sheet of flat material such as a sheet of plywood that can be placed on the earth's surface 48 before wheel 46 is brought into engagement with it. Thus, if a trailer is parked in an area where the earth provides low traction, then before the trailer is unhitched from the vehicle which has parked the trailer, a sheet of plywood or similar material can be placed down so that when the jack is moved into position to remove the trailer hitch from the towing vehicle, wheel 46 will rest on the plywood or other sheet material. In this way, when it comes time to reconnect the trailer to a vehicle, movement of the wheel can take place entirely upon a sheet of material ensuring that good traction is provided for moving the short distance necessary to effect a hook up of a trailer hitch to a vehicle trailer hitch ball.

An important aspect of the invention herein is that wheel 46 is directly underneath the longitudinal axis of shaft 38, including the shaft telescoping lower portion 40, so that no lateral forces are applied to the shaft or to the bracket 32, 34 by which it is supported. Further, although not illustrated in the drawings, a latch can be provided to prevent the inadvertent rotation of the second crank arm 58 to thereby lock wheel 46 in position. This would be important if a trailer is parked on an uneven surface so that the trailer might inadvertently move. In other words, the trailer tongue jack of this invention having a power wheel can easily be arranged so that the wheel is locked in position to provide a safety feature.

Figure 10:
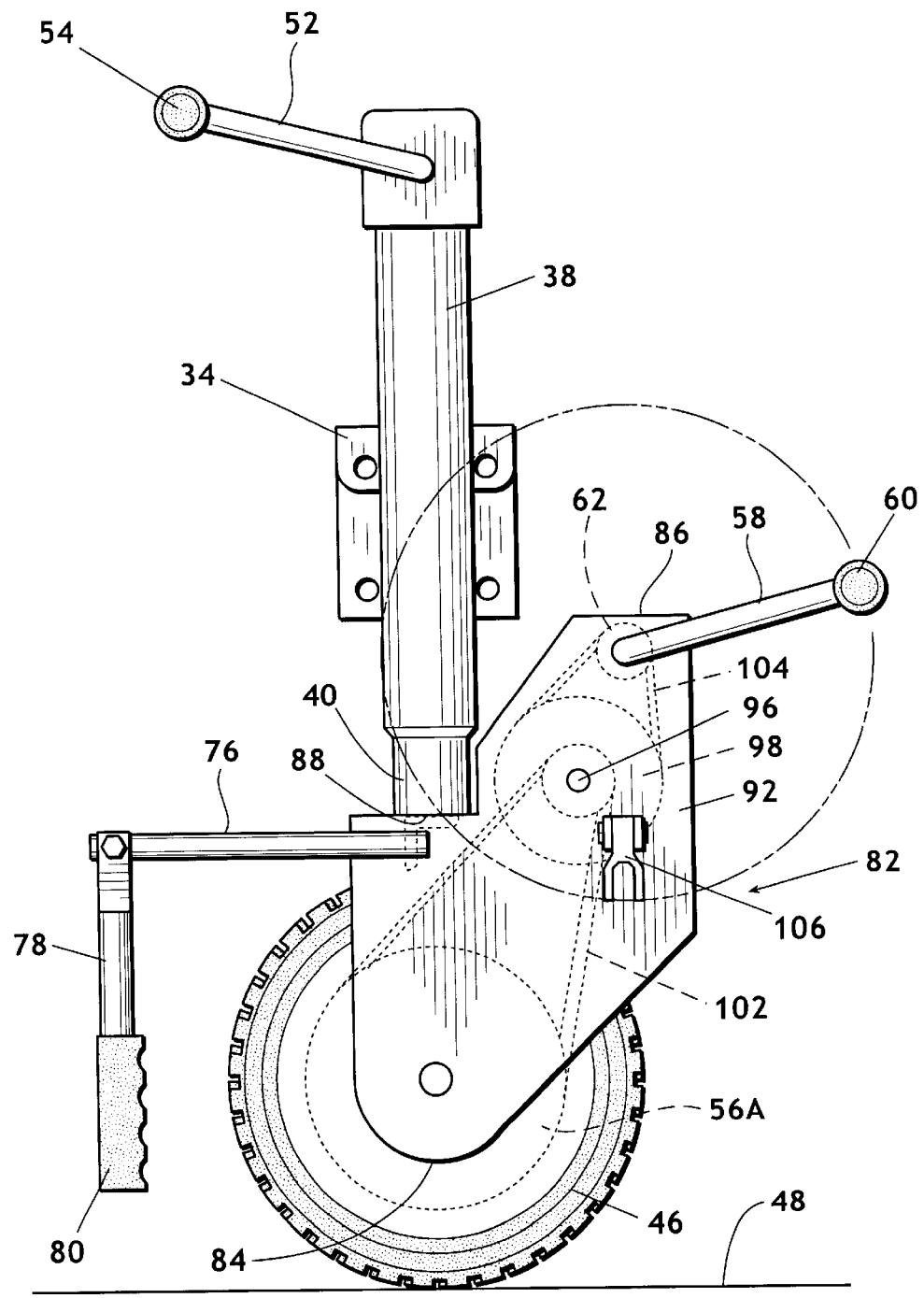
FIG. 10 is an elevational view similar to FIG. 4 but showing the improved embodiment of the invention which mechanical advantage is employed to manually apply torque to move a trailer tongue and further this embodiment reduces the amount of bending or stooping over of a user when moving a trailer tongue.
Figure 11:
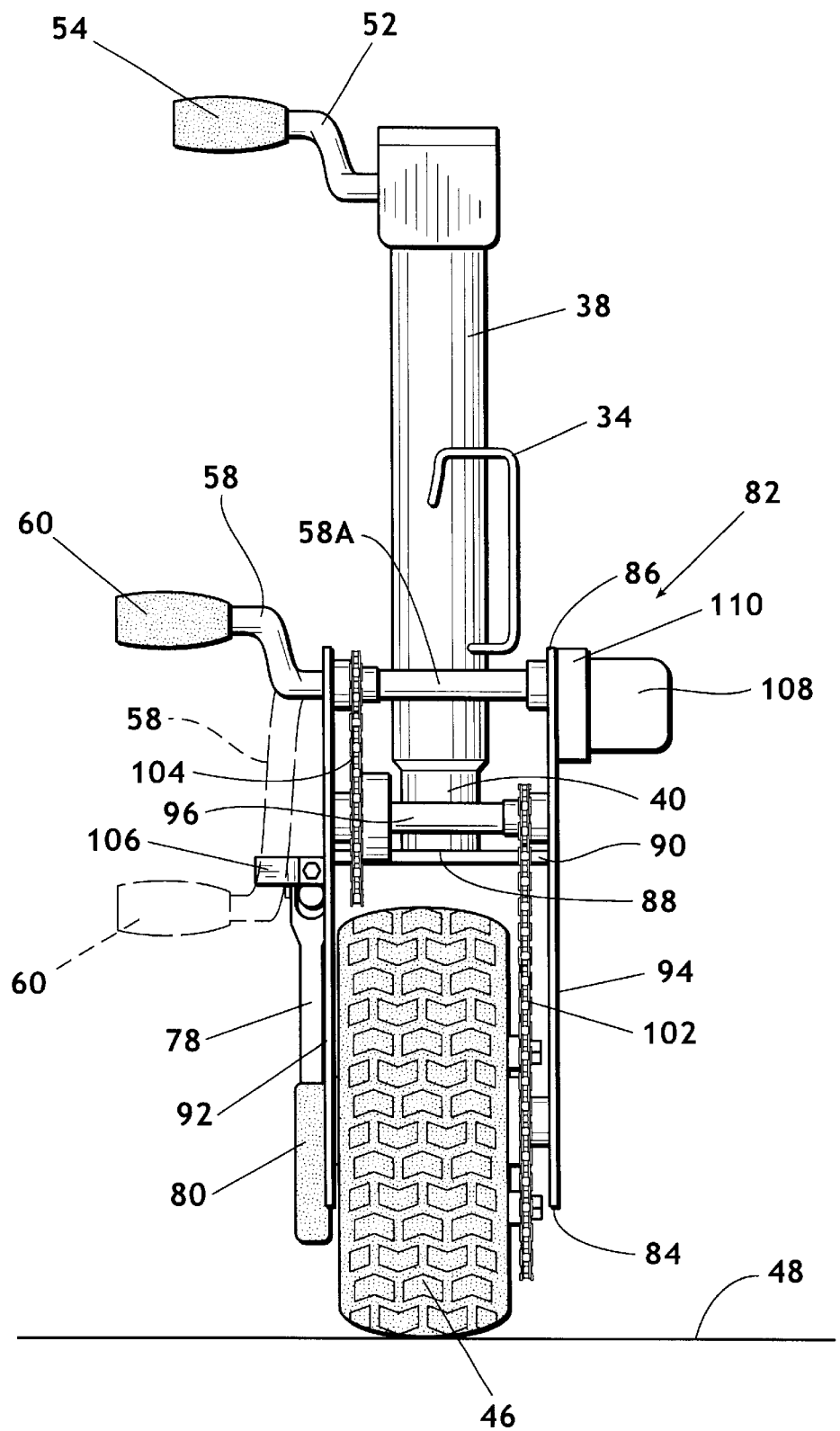
FIG. 11 is a rear view of the improved trailer tongue jack of FIG. 10.
Figure 12:
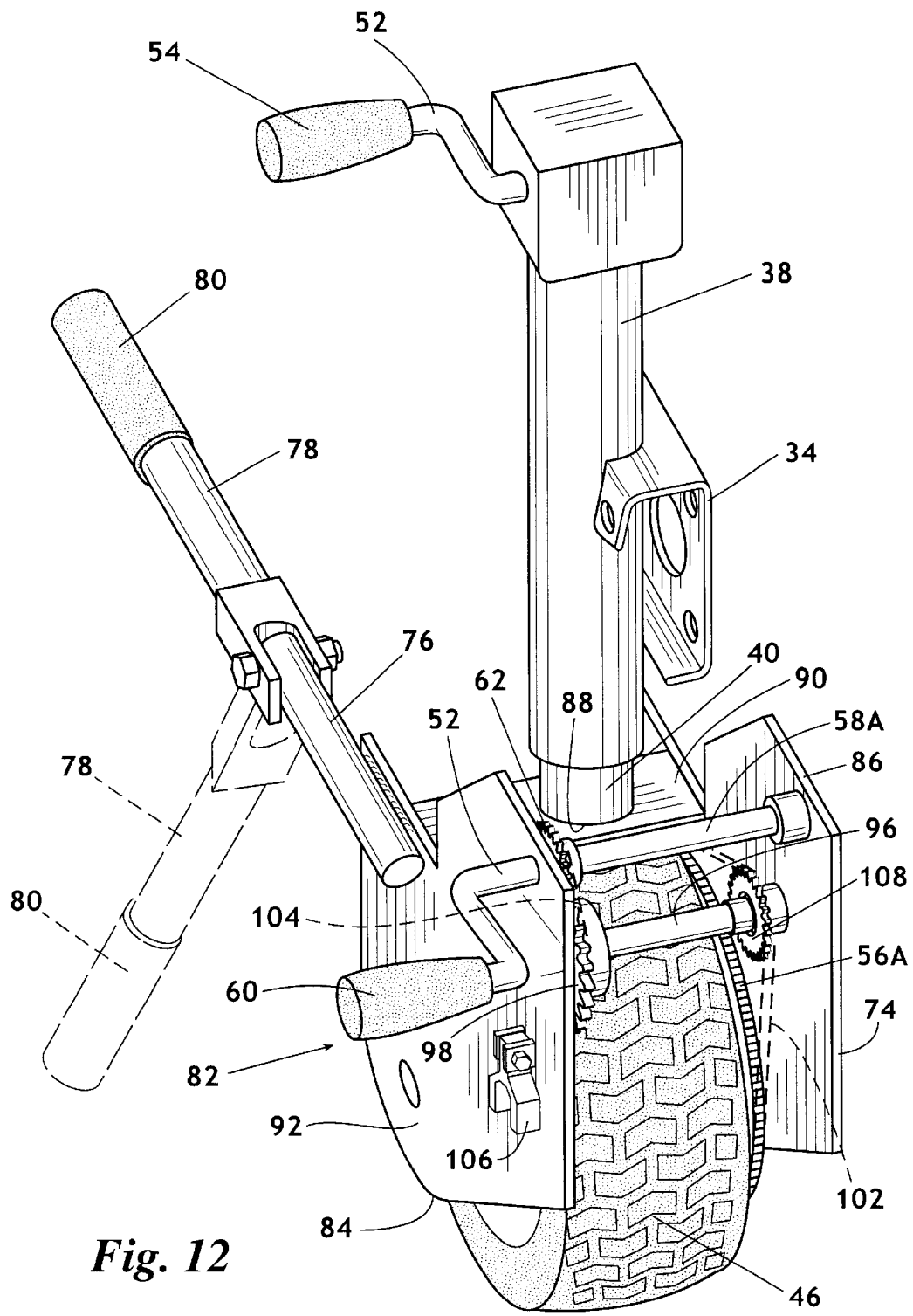
FIG. 12 is an isometric view of the trailer tongue jack of FIGS. 10 and 11.

FIGS. 10, 11, and 12 show an alternate, improved embodiment of the invention. Particularly the embodiment shown in FIGS. 10–12 provides a trailer tongue jack having manually powered guidance in an arrangement for achieving mechanical advantage to rotate the trailer jack wheel and in which the crank arm by which rotating power is applied to the trailer jack wheel is mounted elevationally higher so that the user is not required to bend or stoop over excessively to move a trailer jack tongue. Specifically, FIGS. 10–12 show an improved wheel housing generally indicated by the numeral 82, the wheel housing having a lower end 84 and an upper end 86. Crank arm 58 having handle 60 is positioned adjacent the wheel housing upper end 86. The lower end 88 of longitudinal shaft lower portion 40 rests on a horizontal plate 90 that extends between a first wheel housing sidewall 92 and a second wheel housing sidewall 94. Wheel housing 82 will normally have additional reinforcing struts or brackets extending between the vertical sidewalls 92 and 94 but these are not shown since they are structural design features and not part of the invention.

A driven gear 56A, as has been described with reference to FIGS. 1–9, is secured for rotation with wheel 46, the gear 56A being seen in FIG. 12. An intermediate shaft 96 extends between sidewalls 92 and 94 and has a power gear 98 and driven gear 100 secured thereto (as seen in FIG. 12), the power gear 98 being adjacent first sidewall 92 and driven gear 100 adjacent second sidewall 94. A drive chain that can, as illustrated, be similar to a bicycle drive chain 102, loops around gears 56A and 100, the drive chain 102 being shown FIG. 11 and in dotted outline in FIG. 12. In FIG. 11, chain 102 obscures gears 56A and 100.

Second crank arm 58 includes a shaft portion 58A that extends between sidewalls 92 and 94 and has drive gear 62 (see FIG. 12) thereon as previously described. A chain, such as a bicycle chain 104, loops around drive gear 62 and power gear 98 that is supported to shaft 96. In this manner, when crank arm 58 is manually rotated, power is supplied by way of chains 102 and 104 to thereby rotate wheel 46. This arrangement provides a significant mechanical advantage between the rotation of crank arm 58 and wheel 46 so that the tongue of a relatively large or heavy trailer can be moved without requiring great arm strength.

Further, in the embodiment of FIGS. 10, 11, and 12, the crank arm 58 is located significantly above wheel 46—that is, significantly above the height of the earth's surface 48, as seen in FIGS. 10 and 11, so that the operator is not required to bend or stoop over to an uncomfortable position in order to rotate wheel 46.

Serving as a parking break, a latch 106 is pivotally supported to sidewall 92. Latch 106 is moved between a downward, non-use position and a horizontal, used position. FIGS. 10 and 12 show latch 106 pivoted downwardly to lie parallel to first sidewall 92 and therefore in a position that does not interfere with the rotation of crank arm 58. However, latch 106 can be pivoted upwardly to a horizontal position as shown in FIG. 11 to engage crank arm 58 to prevent its inadvertent rotation and thereby lock wheel 46 against rotation. This serves as a safety brake to prevent a trailer tongue moving with respect to the earth's surface inadvertently such as could be caused by high wind or if the trailer is on an inclined slope.

FIG. 11 shows an electric motor 108 having a gear drive 110 attached for rotation of second crank arm shaft 58A. Electric power could be conveniently supplied from a plug attached to a battery of a vehicle (not seen) used to pull the trailer to which the trailer tongue jack of this invention is applied. Motor 108 can be used to rotate second crank shaft 58A. Thus, by use of electrical power, shaft 58A could be rotated rather than rotating it manually to thereby move a trailer tongue. When electric power is used, the crank arm 58 and handle 60 would not be employed and could be dispensed with. As an alternate arrangement, the crank arm 58 and handle 60 could be detachable relative to crank arm shaft 58A so that they could be attached when it is desired to manually position a trailer tongue and detached when motor 108 is used to move the trailer tongue.

The use of a motor 108 with or without a gear drive 110 is illustrated herein as being directly connected to second crank arm shaft 58A. This is by way of example only. Various other means may be employed to drive the system of this invention electrically.

Figure 13:
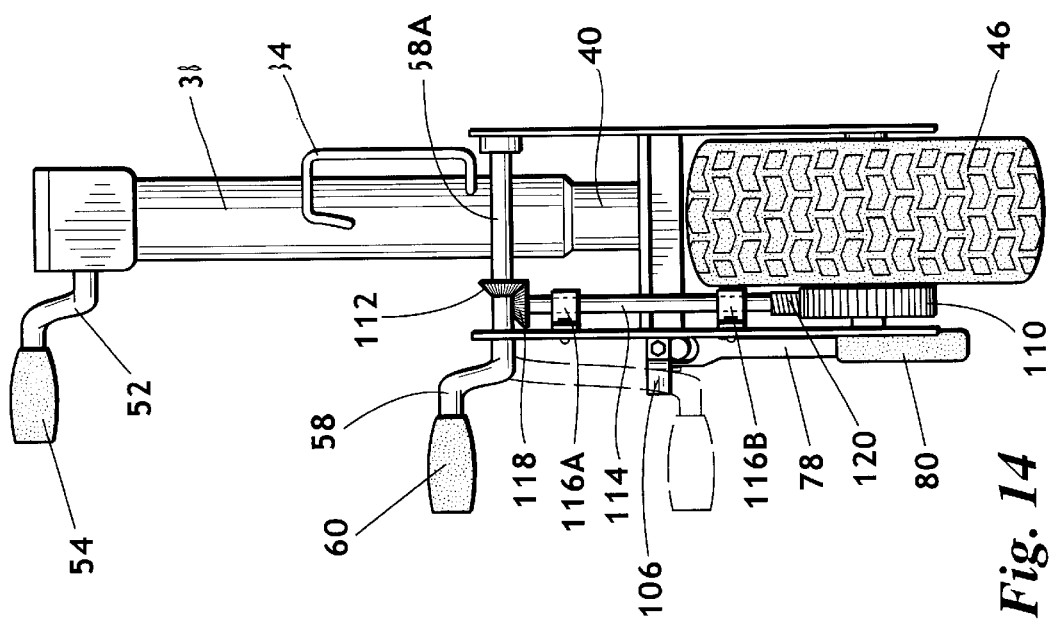
FIG. 13 is an elevational side view of an alternate embodiment of the invention that employs a direct drive mechanism for transferring manually applied rotary motion to rotate the trailer jack wheel to move a trailer tongue.
Figure 14:
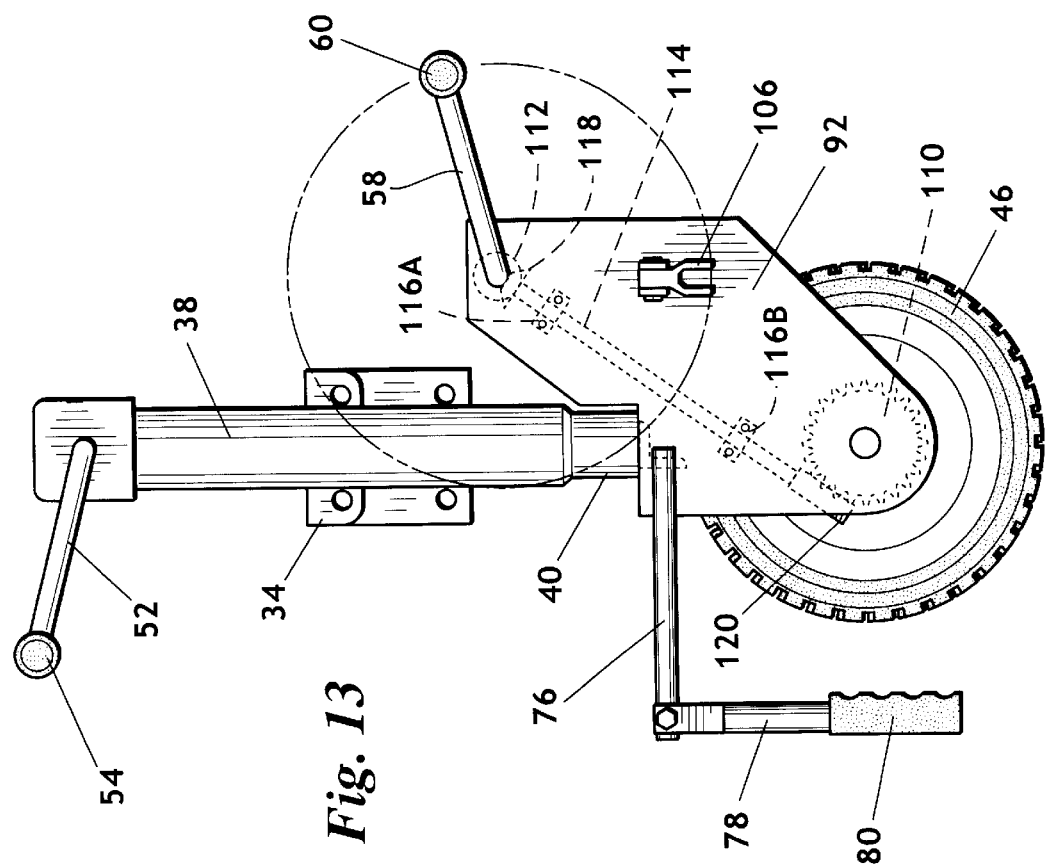
FIG. 14 is a rear view of the alternative embodiment of the invention illustrated in FIG. 13.

FIGS. 13 and 14 show another embodiment of the invention. A gear drive 110 is secured to rotate wheel 46. Crank arm shaft 58A has a bevel drive gear 112 thereon. A drive shaft 114 is rotatably supported relative to first sidewall 92 by means of bushings 116A and 116B. A beveled driven gear 118 is affixed to the upper end of drive shaft 114 so that by rotation of crank arm 58, shaft 114 is rotated. At the lower end of shaft 114 is a worm gear 120 that engages gear drive 110.

When crank arm 58 is rotated, torque is applied from beveled gears 112 and 118 to rotate shaft 114 and, in turn, worm gear 120. Worm gear 120 is meshed against drive gear 110 to thereby rotate wheel 46. Thus, in the system of FIGS. 13 and 14, chains are not used. Because of the natural gear reduction relationship between worm gear 120 and drive gear 110, a significant mechanical advantage is obtained utilizing the system of FIGS. 13 and 14 without supplemental gearing arrangements. At the same time, crank arm 58 mounted at an elevated position to achieve the convenience of use that has been described with respect to the embodiment of FIGS. 10 through 12 in that the user is not required to stoop over excessively.

In both of the embodiments illustrated in FIGS. 10 through 14, crank arm handle 60 and steering lever 76 are both positioned significantly above the earth's surface for easy cranking and are both positioned on the same sidewall 92. In some situations, it may be advantageous if steering lever 76, 78 was on second sidewall 94 so that crank arm and handle 60 extend from opposite sidewalls. This is a matter of design choice and, while not illustrated, would be within the scope of the disclosure.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An improved jack for supporting and moving a horizontally extending trailer tongue above the earth's surface comprising:

a longitudinally extending support shaft having an upper portion and extending therefrom a telescoping and axially rotatable lower portion;

a bracket rotatably supporting said support shaft upper portion to a trailer tongue by which the support shaft may be pivoted between a horizontal position substantially parallel to the trailer tongue and a vertical position;

a vertically extending wheel housing affixed to said support shaft lower portion and having an upper end and a lower end;

a ground-engaging wheel rotatably supported adjacent said wheel housing lower end and having a wheel gear affixed thereto;

a crank arm rotatably supported by said wheel housing adjacent said upper end thereof at a height closer to the trailer tongue than the earth's surface; and a rotation transfer system coupling said crank arm to said wheel for moving said trailer tongue, the elevation of said crank arm requiring reduced bending over by an operator standing on the earth's surface.

2. An improved jack for supporting and moving a horizontally extending trailer tongue above the earth's surface comprising:

a longitudinally extending support shaft having an upper portion and extending therefrom a telescoping and axially rotatable lower portion;

a bracket rotatably supporting said support shaft upper portion to a trailer tongue by which the support shaft may be pivoted between a horizontal position substantially parallel to the trailer tongue and a vertical position;

a vertically extending wheel housing affixed to said support shaft lower portion and having an upper end and a lower end;

a ground-engaging wheel rotatably supported adjacent said wheel housing lower end and having a wheel gear affixed thereto;

a crank arm rotatably supported by said wheel housing adjacent said upper end thereof at a height closer to the trailer tongue than the earth's surface;

a crank arm rotatably supported by said wheel housing having a portion that sweeps close to an exterior surface of a sidewall of said wheel housing;

a rotation transfer system coupling said crank arm to said wheel for moving said trailer tongue, the elevation of said crank arm requiring reduced bending over by an operator standing on the earth's surface; and a latch pivotally supported to said exterior surface of said wheel housing sidewall pivotal between a first position that is clear of said crank arm as it is rotated and a position that restrains the rotation of said crank arm.

* * * * *